(12) United States Patent
Nam et al.

(10) Patent No.: US 9,645,613 B2
(45) Date of Patent: May 9, 2017

(54) FLEXIBLE DISPLAY DEVICE INCLUDING MULTI-LAYER WINDOW MEMBER

(71) Applicant: Samsung Display Co., Ltd., Yongin, Gyeonggi-Do (KR)

(72) Inventors: SeungWook Nam, Cheonan-si (KR); Kyu Young Kim, Suwon-si (KR); Ahyoung Kim, Gunpo-si (KR); Gui-Nam Min, Hwaseong-si (KR); Kyu-taek Lee, Cheonan-si (KR); Yong Cheol Jeong, Yongin-si (KR); Soyeon Han, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 248 days.

(21) Appl. No.: 14/640,119

(22) Filed: Mar. 6, 2015

(65) Prior Publication Data
US 2015/0268697 A1    Sep. 24, 2015

(30) Foreign Application Priority Data
Mar. 18, 2014  (KR) .................. 10-2014-0031715

(51) Int. Cl.
| | | |
|---|---|---|
| *G06F 1/16* | (2006.01) | |
| *B32B 3/30* | (2006.01) | |
| *B32B 7/02* | (2006.01) | |
| *B32B 7/12* | (2006.01) | |

(52) U.S. Cl.
CPC ............. *G06F 1/1652* (2013.01); *B32B 3/30* (2013.01); *B32B 7/02* (2013.01); *B32B 7/12* (2013.01); *G06F 1/1643* (2013.01); *B32B 2307/51* (2013.01); *B32B 2457/20* (2013.01); *Y10T 428/24488* (2015.01); *Y10T 428/24612* (2015.01)

(58) Field of Classification Search
CPC .... B32B 3/30; B32B 7/02; B32B 7/12; B32B 2307/51; B32B 2457/20; B32B 2457/206; B32B 2457/208; B32B 27/281; G06F 1/1652; G06F 1/1643; G06F 1/1626; G06F 1/203; G02F 1/167; G02F 1/133305; Y10T 428/24612
See application file for complete search history.

(56) References Cited

U.S. PATENT DOCUMENTS 8,194,399 B2 *  6/2012  Ashcraft et al. ...... G06F 1/1626
                                                          257/59
2013/0034685 A1   2/2013  An et al.

FOREIGN PATENT DOCUMENTS

| JP | 2012-179832 A | 9/2012 |
|---|---|---|
| KR | 1020090078269 A | 7/2009 |
| KR | 10-1118041 B1 | 2/2012 |
| KR | 1020130046758 A | 5/2013 |

* cited by examiner

*Primary Examiner* — Catherine A Simone
(74) *Attorney, Agent, or Firm* — Cantor Colburn LLP

(57) ABSTRACT

A flexible display device includes a flexible display panel and a window member. The flexible display panel includes a folding area, and a peripheral area disposed adjacent to the folding area. The window member includes a first base layer on the flexible display panel, and a second base layer having a substantially same modulus as that of the first base layer. A first thickness portion of the second base layer, which overlaps the folding area, has a thickness smaller than a thickness of a second thickness portion of the second base layer, which overlaps the peripheral area.

20 Claims, 8 Drawing Sheets

# FLEXIBLE DISPLAY DEVICE INCLUDING MULTI-LAYER WINDOW MEMBER

This application claims priority to Korean Patent Application No. 10-2014-0031715, filed on Mar. 18, 2014, and all the benefits accruing therefrom under 35 U.S.C. §119, the contents of which are hereby incorporated by reference in its entirety.

BACKGROUND

1. Field

The invention relates to a flexible display device. More particularly, the invention relates to a flexible display device capable of reducing defects.

2. Description of the Related Art

A curved display device and a foldable (or bendable) display device (hereinafter, referred to as a flexible display device) have been developed. The flexible display device includes a flexible display panel and various functional members.

The functional members are disposed on at least one surface of opposing surfaces of the flexible display panel. The functional members are curved and bent together with the flexible display panel.

SUMMARY

One or more exemplary embodiment of the invention provides a flexible display device capable of maintaining durability and reducing bending stiffness thereof.

Exemplary embodiments of the invention provide a flexible display device including a flexible display panel and a window member. The flexible display panel includes a folding area in which a folding axis is defined and a peripheral area disposed adjacent to the folding area. The window member is on a surface of the flexible display panel and overlaps the folding area and the peripheral area.

According to an exemplary embodiment, the window member includes a first base layer on the flexible display panel, and a second base layer on the first base layer and having a same elastic modulus as the first base layer. A first thickness portion of the second base layer, which overlaps the folding area, has a thickness smaller than a thickness of a second thickness portion of the second base layer, which is different from the first thickness portion and overlaps the peripheral area.

The window member may have a substantially uniform thickness. The thickness of the window member may be in a range from about 20 micrometers to about 300 micrometers. The window member may include a flat outer surface defined by a surface of the second base layer.

A first thickness portion of the first base layer, which corresponds to the first thickness portion of the second base layer, may have a thickness greater than a thickness of a second thickness portion of the first base layer, which is different from the first thickness portion thereof and corresponds to the second thickness portion of the second base layer.

The first and second base layers may include a substantially same material. A first thickness portion of the first base layer, which overlaps the first thickness portion of the second base layer, may have a thickness corresponding to about 80% to about 120% of the thickness of the first thickness portion of the second base layer.

A second thickness portion of the first base layer, which overlaps the second thickness portion of the second base layer, may have a thickness equal to or smaller than about 40% of the thickness of the second thickness portion of the second base layer.

A width in a first direction substantially perpendicular to the folding axis and a thickness direction, of the first thickness portion of the second base layer, may be equal to or smaller than a width in the first direction of the folding area. The first thickness portion of the second base layer may have a uniform thickness.

The first thickness portion of the second base layer may have a peak position in a cross-section taken along the first direction.

The first thickness portion of the second base layer may include a center portion, and boundary portions arranged adjacent to the center portion in the first direction and having different thicknesses. The center portion may have the thickness greater than the thicknesses of the boundary portions.

The window member may further include an optically transparent adhesive resin layer between the first base layer and the second base layer and attaching the first and second base layers to each other. The optically transparent adhesive resin layer may have an elastic modulus equal to or smaller than about 1 megapascal (MPa).

The flexible display device may further include a touch screen and a polarizing plate, between the surface of the flexible display panel and the window member.

According to an exemplary embodiment, the window member includes a plurality of base layers having a substantially same elastic modulus. A first thickness portion of an outer base layer farthest away from the flexible display panel among the plurality of base layers, which overlaps the folding area, has a thickness smaller than a thickness of a second thickness portion of the outer base layer, which overlaps the peripheral area.

A sum of thicknesses of second thickness portions of base layers except for the outer base layer among the plurality of base layers, which overlap the peripheral area, is equal to or smaller than about 40% of the thickness of the second thickness portion of the outer base layer.

According to one or more exemplary embodiment, the window member includes the first and second base layers including the same material. Therefore, deformation of the window member due to the difference in physics between the base layers may be reduced or effectively prevented. In addition, the manufacturing cost of the window member including the first and second base layers of the same material is reduced.

Since the window member includes the multiple base layers, the bending stiffness of the flexible display device including the window member is reduced. The window member has the multi-layer structure, and thus the window member is easily folded in the folding area of the flexible display device. That is, the multi-layer structure window member is more easily folded than a window member having a single-layer structure. When the multiple base layers have the substantially same thickness in the folding area of the flexible display device, the window member may be easily folded.

Since the thickness of the second thickness portion of the second base layer is greater than that of the first thickness portion of the second base layer, the peripheral area of the flexible display device may maintain the predetermined durability. The multi-layer structure window member has the same stiffness corresponding to that of a window member having a single-layer structure.

BRIEF DESCRIPTION OF THE DRAWINGS

The above and other advantages of the disclosure will become readily apparent by reference to the following detailed description when considered in conjunction with the accompanying drawings wherein.

DETAILED DESCRIPTION

Figure 1A:
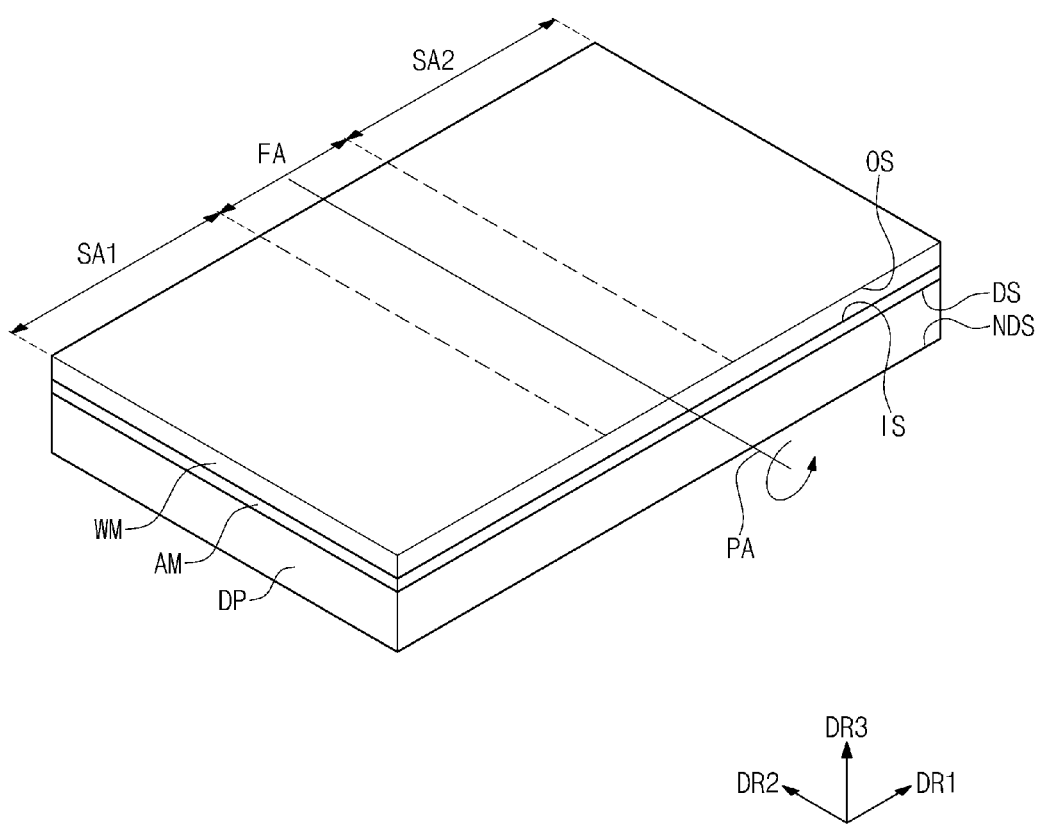
FIG. 1A is a perspective view showing an exemplary embodiment of a flexible display device, in an unfolded state thereof, according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a," "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be explained in detail with reference to the accompanying drawings.

Figure 1B:
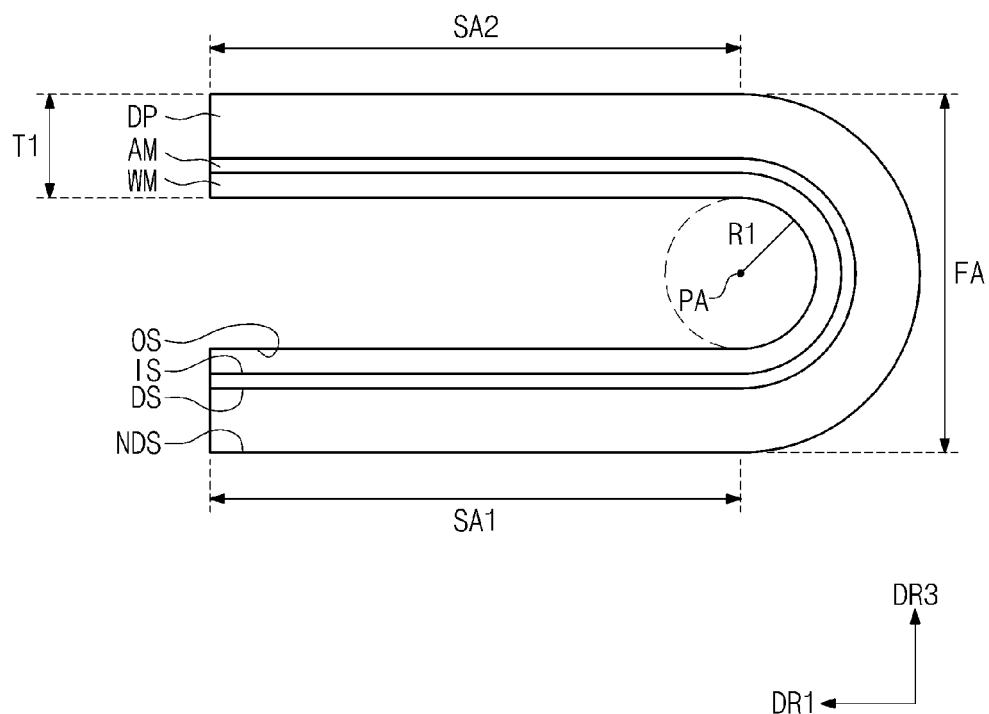
FIG. 1B is a side view showing the flexible display device of FIG. 1A, in a folded state thereof, according to the invention.

FIG. 1A is a perspective view showing an exemplary embodiment of a flexible display device, in an unfolded state thereof, according to the invention and FIG. 1B is a side view showing the flexible display device of FIG. 1A, in a folded thereof, according to the invention.

Referring to FIGS. 1A and 1B, a flexible display device (hereinafter, referred to as a display device) includes a flexible display panel DP (hereinafter, referred to as a display panel), and a flexible window member WM (hereinafter, referred to as a window member) disposed on a surface of the display panel DP.

The display panel DP includes a flexible base substrate (not shown), signal lines (not shown) disposed on the base substrate, and pixels (not shown) electrically connected to the signal lines. The pixels generate images in response to signals provided through the signal lines. The display panel DP may be an organic light emitting display panel, an electrophoretic display panel or an electrowetting display panel, but the invention is not limited thereto.

A surface of the display panel DP, in which the image is displayed, is referred to as a display surface DS, and a surface of the display panel DP opposing the display surface DS, in which no image is displayed, is referred to as a non-display surface NDS. The display panel DP shown in FIGS. 1A and 1B includes one display surface DS, but the number of the display surfaces of the display panel DP should not be limited to one. That is, the display panel DP may include two display surfaces to display one or more images.

The window member WM is configured to protect the display panel DP. The window member WM includes a transparent material. Although not shown in detail, the window member WM includes a plurality of base layers. An adhesive layer is disposed between adjacent base layers among the plurality of base layers to couple the adjacent base layers to each other. The adhesive layer may include an optically transparent adhesive resin, but the invention is not limited thereto.

A surface OS of the window member WM serves as an outer surface of the display device. The outer surface OS of the display device makes contact with an input device, e.g., a touch pen. A surface IS of the window member WM opposing the surface OS serves as an adhesive surface making contact with an adhesive member described later.

The display panel DP is coupled to the window member WM such as by using a transparent adhesive member AM. The adhesive member AM may be an ultraviolet-ray curable pressure-sensitive adhesive. The display panel DP may not be directly coupled to the window member WM via a coupling member. That is, functional members may be further disposed between the display panel DP and the window member WM which are coupled to each other. The functional members will be described in detail later.

The display device is configured to be curved or rolled over the whole area thereof, or bent in a specific area thereof. The display device includes a folding area FA and peripheral areas SA1 and SA2 defined on a plane surface which is defined by a first direction DR1 and a second direction DR2. FIGS. 1A and 1B show the display device including one folding area FA and two peripheral areas SA1 and SA2 as a representative example, but the invention is not limited thereto.

The display device is folded in the folding area FA. The display device is folded along a folding axis PA defined in the folding area FA. The folding axis PA is an imaginary axis extending in the second direction DR2. The peripheral areas SA1 and SA2 are disposed adjacent to the folding area FA in the first direction DR1. The peripheral areas SA1 and SA2 are flat or slightly curved in a folded state of the display device. The folding area FA and the peripheral areas SA1 and SA2 are each defined in both the display panel DP and the window member WM.

As shown in FIG. 1B, the display device may be folded to allow the two peripheral areas SA1 and SA2 to face each other. The display device has a curvature radius R1 of about 0.5 millimeter (mm) to about 10 millimeters (mm), but the invention is not limited thereto or thereby. That is, the display device may be folded to form an included angle of about 10 degrees to about 90 degrees between the two peripheral areas SA1 and SA2.

A thickness T1 in a normal line direction DR3 of the plane surface defined by the first direction DR1 and the second direction DR2 of display device is substantially the same as a sum of thicknesses of the display panel DP, the window member WM and the adhesive member AM. As the thickness T1 of the display device increases, tension-compression strain occurring on the display device increases.

Figure 2A:
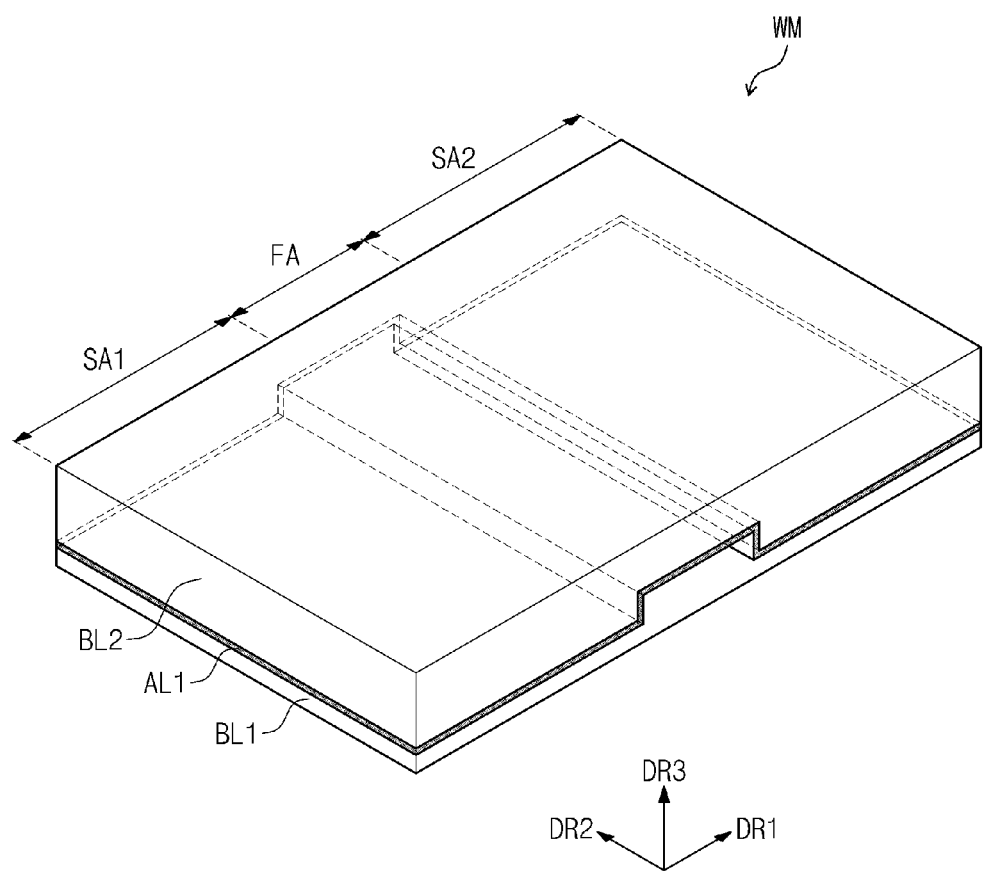
FIG. 2A is a perspective view showing an exemplary embodiment of a window member, in an unfolded state thereof, according to the invention.
Figure 2B:
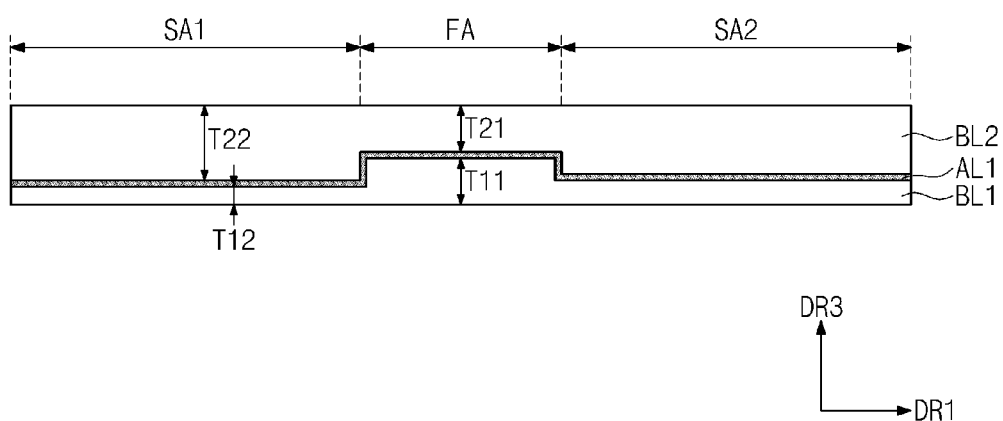
FIG. 2B is a side view showing the window member of FIG. 2A, in an unfolded thereof, according to the invention.

FIG. 2A is a perspective view showing an exemplary embodiment of a window member WM, in an unfolded state thereof, according to the invention and FIG. 2B is a side view showing the window member WM of FIG. 2A, in an unfolded state thereof, according to the invention.

The window member WM includes a plurality of base layers BL1 and BL2. FIGS. 2A and 2B show the window member WM including first and second base layers BL1 and BL2 as a representative example, but the invention is not limited thereto.

Each of the first and second base layers BL1 and BL2 includes a plastic member. The first and second base layers BL1 and BL2 include the same material. In an exemplary embodiment, for instance, the first and second base layers BL1 and BL2 may be a plastic member including polyimide. The first and second base layers BL1 and BL2 may not include the same material, but do have substantially the same elastic modulus.

The first base layer BL1 is coupled to the second base layer BL2 via an adhesive layer AL1 disposed between the first and second base layers BL1 and BL2. The adhesive layer AL1 includes an optically transparent and adhesive material such as an optically transparent adhesive resin. The adhesive layer AL1 may include at least one of acryl-based resin and silicon-based resin.

In order to decrease a stress occurring when the window member WM is bent, the adhesive layer AL1 has a relatively low elastic modulus. The elastic modulus of the adhesive layer AL1 is equal to or lower than about 1 megapascal (MPa). The adhesive layer AL1 having the relatively low elastic modulus exerts minimal influence on the increase of the stress of the window member WM. When the window member WM is bent, the stress corresponding to the elastic modulus of the first and second base layers BL1 and BL2 occurs on the window member WM.

In an exemplary embodiment of manufacturing the flexible display device, the first base layer BL1 and the second base layer BL2 may be coupled to each other after an optically transparent adhesive resin in a liquid state is coated on the first base layer BL1 and/or the second base layer BL2. Then, the optically transparent adhesive resin in the liquid state is cured to form the adhesive layer AL1. The first and second base layers BL1 and BL2, each having a thickness varied depending on areas thereof, may be manufactured by dry-etching or laser-etching a plastic member.

The window member WM is disposed on the display panel DP (refer to FIGS. 1A and 1B) such that the first base layer BL1 is disposed closer to the display panel DP than the second base layer BL2. That is, the first base layer BL1 is disposed under the second base layer BL2 in the normal line direction DR3, with reference to the unfolded state.

Each of the first and second base layers BL1 and BL2 has a varied thickness depending on the area of or location on the window member WM. The overall window member WM has a substantially uniform thickness regardless of the area thereof.

The first base layer BL1 includes a first portion overlapped with the folding area FA and second portions overlapped with the peripheral areas SA1 and SA2. The first portion of the first base layer BL1, which is overlapped with the folding area FA, has a thickness T11 greater than a thickness T12 of the second portions of the first base layers BL1, which are overlapped with the peripheral areas SA1 and SA2. In the illustrated exemplary embodiment, the thicknesses T11 and T12 are defined by an average value within the respective area of the window member WM. The first portion of the first base layer BL1 is considered defined by a portion thereof having a different thickness than the adjacent second portions thereof, and overlapping the folding area FA.

A width in the first direction DR1 of the first portion of the first base layer BL1 may be substantially the same as a width in the first direction DR1 of the folding area FA. The thickness T11 of the first portion of the first base layer BL1 is substantially uniform. According to another exemplary embodiment, a ratio of the width in the first direction DR1 of the first portion of the first base layer BL1 to the width in the first direction DR1 of the folding area FA may be varied.

Referring to FIG. 2B, a first (e.g., lower) surface of the first base layer BL1 corresponds to an adhesive surface of the first base layer BL1 (or the overall window member WM), attached to the display panel DP, and a second (e.g., upper) surface of the first layer BL1 opposing the first surface corresponds to an adhesive surface of the first base layer BL1, which is attached to the second base layer BL2. The first surface of the first base layer BL1 serves as the other surface IS (refer to FIGS. 1A and 1B) of the window member WM and is flat.

The second base layer BL2 includes a first portion overlapped with the folding area FA and second portions overlapped with the peripheral areas SA1 and SA2. The first portion of the second base layer BL2, which is overlapped with the folding area FA, is coupled to the first portion of the first base layer BL1. The second portions of the second base layer BL2, which are overlapped with the peripheral areas SA1 and SA2, are coupled to the second portions of the first base layer BL1, respectively. The first portion of the second base layer BL2 is considered defined by a portion thereof having a different thickness than the adjacent second portions thereof, and overlapping the folding area FA.

A width in the first direction DR1 of the first portion of the second base layer BL2 may be substantially the same as the width in the first direction DR1 of the first portion of the first base layer BL1. The first and second base layers BL1 and BL2 have shapes that are engaged with each other, such as in the cross-sectional direction illustrated in FIG. 2B.

The first portion of the second base layer BL2, which is overlapped with the folding area FA, has a thickness T21 smaller than a thickness T22 of the second portions of the second base layer BL2, which are overlapped with the peripheral areas SA1 and SA2. In the illustrated exemplary embodiment, the thicknesses T21 and T22 are defined by an average value within the respective area of the window member WM. The thickness T21 and T22 of the first and second portions of the second base layer BL2 are respectively substantially uniform.

Referring again to FIG. 2B, a first (e.g., upper) surface of the second base layer BL2 serves as an adhesive surface of the second base layer BL1 (or the overall window member WM), which is attached to the first base layer BL1, and a second (e.g., lower) surface of the second base layer BL2 serves as the surface OS (refer to FIGS. 1A and 1B) of the window member WM. The second surface of the second base layer BL2 corresponds to the flat outer surface of the overall display device.

One or more exemplary embodiment of the window member WM according to the invention may be more easily folded in the folding area FA than a window member (hereinafter, referred to as a comparative window member) having one single layer of uniform thickness equal to that of the overall comparative window member. Exemplary embodiments of the window member WM according to the invention may be more easily folded in the folding area FA because the window member WM includes the plural layers configured to provide a relatively smaller bending stiffness than that of the comparative window member having the single layer of uniform thickness equal to that of the overall comparative window member.

The bending stiffness of the comparative window member is represented by the following Equation.

$$BS \propto E \times TH^3 \qquad \text{Equation}$$

In Equation, "BS" denotes the bending stiffness, "E" denotes the elastic modulus of the comparative window member, and "TH" denoted the thickness of the comparative window member. When the comparative window member and the window member WM include the same material, "E" is constant.

The bending stiffness of the comparative window member is proportional to a cube of the thickness of the single layer thereof. In contrast, the bending stiffness of the multi-layered window member WM is equal to a sum of bending stiffnesses of the multiple layers having different thicknesses. The bending stiffness of the window member WM is equal to the sum of the bending stiffness of the first base layer BL1 and the bending stiffness of the second base layer BL2. In other words, the bending stiffness in the folding area FA of the window member WM is proportional to a sum of the cube of the thickness T11 of the first portion of the first base layer BL1 and the cube of the thickness T21 of the first portion of the second base layer BL2. Accordingly, one or more exemplary embodiment of the window member WM according to the invention has the relatively smaller bending stiffness in the folding area FA than that of the comparative window member.

The window member WM has an overall thickness of about 20 micrometers to about 300 micrometers. The window member WM is configured to have a predetermined stiffness or more in order to protect the display panel DP from external impacts. To this end, the overall thickness of the window member WM is greater than about 20 micrometers. In addition, the overall thickness of the window member WM is smaller than about 300 micrometers to reduce the tension-compression strain proportional to the thickness. The thickness of the window member WM may be varied in the above-mentioned range depending on the material used to form the first and second base layers BL1 and BL2.

The thickness T11 of the first portion of the first base layer BL1 corresponds to a range of about 80% to about 120% of the thickness T21 of the first portion of the second base layer BL2. In other words, the thickness T11 of the first portion of the first base layer BL1 may be equal to the thickness T21 of the first portion of the second base layer BL2. This is to maintain the relatively low bending stiffness in the folding area FA of the window member WM.

The second portions of the second base layer BL2 have the thickness greater than that of the second portions of the first base layer BL1. In order to maintain a predetermined stiffness in the peripheral areas SA1 and SA2, the thickness T12 of the second portions of the first base layer BL1 is equal to or smaller than about 40% of the thickness T22 of the second portions of the second base layer BL2.

Substantially, the stiffness of the peripheral areas SA1 and SA2 of the window member WM is effectively determined by the stiffness of the thicker second portions of the second base layer BL2, which serve as the outer surface of the overall window member WM. As the thickness of the second portions of the second base layer BL2 increases, the stiffness of the window member WM approaches that of the comparative window member. Therefore, one or more exemplary embodiment of the window member WM according to the invention has the relatively low bending stiffness in the folding area FA and the stiffness substantially corresponding to that of the comparative window member.

Figure 3:
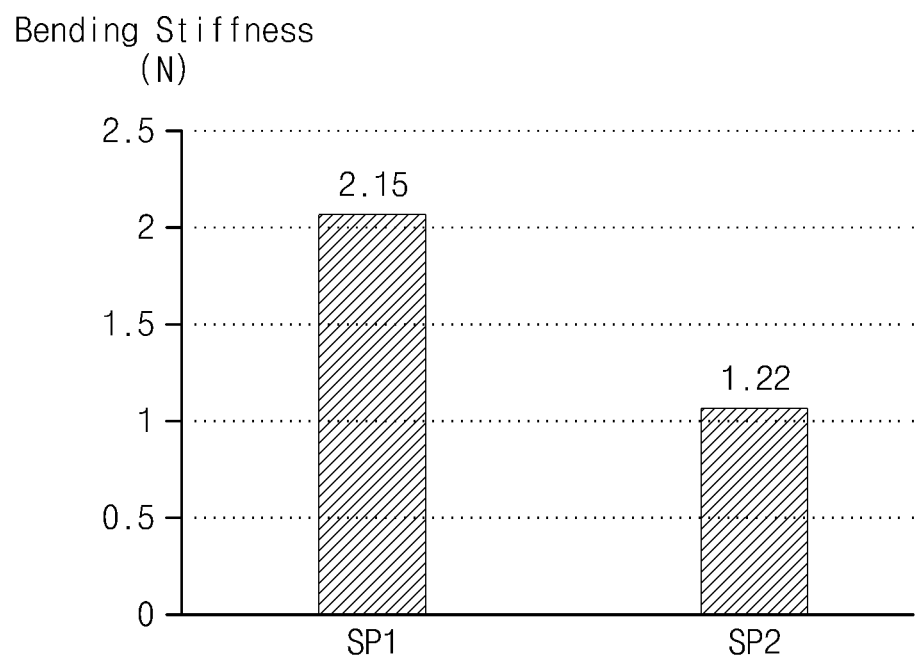
FIG. 3 is a graph showing bending stiffness in Newtons (N) in accordance with exemplary embodiments of structures of window members.

FIG. 3 is a graph showing the bending stiffness (Newtons: N) of exemplary embodiments of structures of window members according to the invention. A first graph SP1 represents the bending stiffness of the comparative window member and a second graph SP2 represents the bending stiffness of the window member WM described with reference to FIGS. 2A and 2B.

The comparative window member having the bending stiffness represented by the first graph SP1 includes the single layer having the thickness of about 200 micrometers. The comparative window member includes a single polyimide film layer. According to the first graph SP1, the bending stiffness is about 2.15 Newton (N).

The second graph SP2 represents the bending stiffness of the window member WM having a double-layer structure. The second graph SP2 represents the bending stiffness of the window member WM including two polyimide film layers, each having a thickness of about 100 micrometers. According to the second graph SP2, the bending stiffness is about 1.22 Newton (N).

As represented by the first and second graphs SP1 and SP2, the window member having the double-layer structure has the relatively lower bending stiffness than the window member having the single-layer structure. One or more exemplary embodiment of the window member WM according to the invention includes the first and second base layers BL1 and BL2, which include the same material, and thus deformation of the window member WM due to a difference in physics between the base layers may be reduced or effectively prevented. In addition, a manufacturing cost of the window member WM is reduced.

Figure 4A:
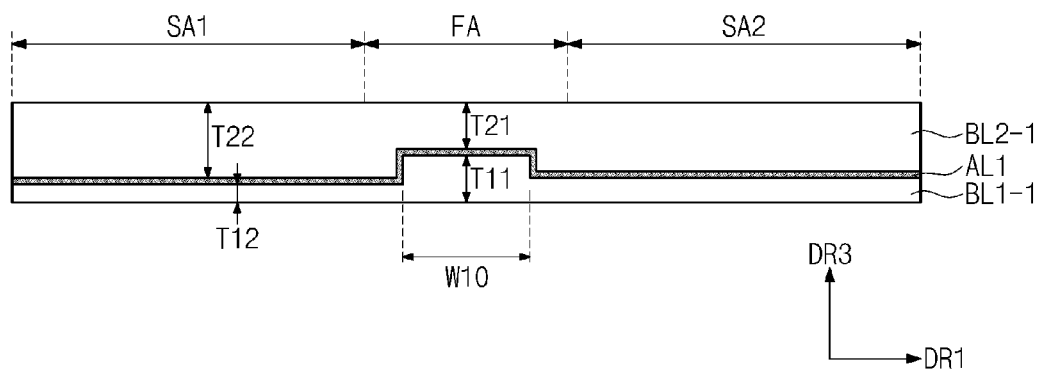
FIGS. 4A to 4C are side views showing exemplary embodiments of window members according to the invention.
Figure 4B:
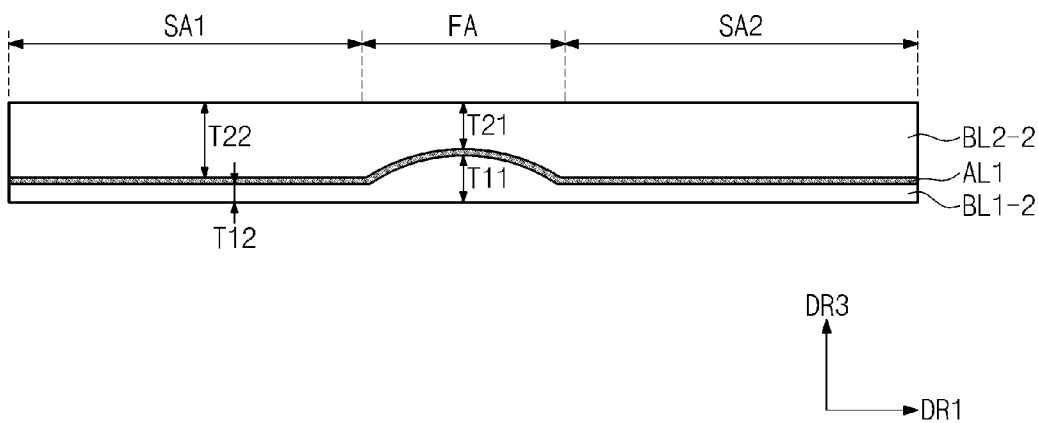
Figure 4C:
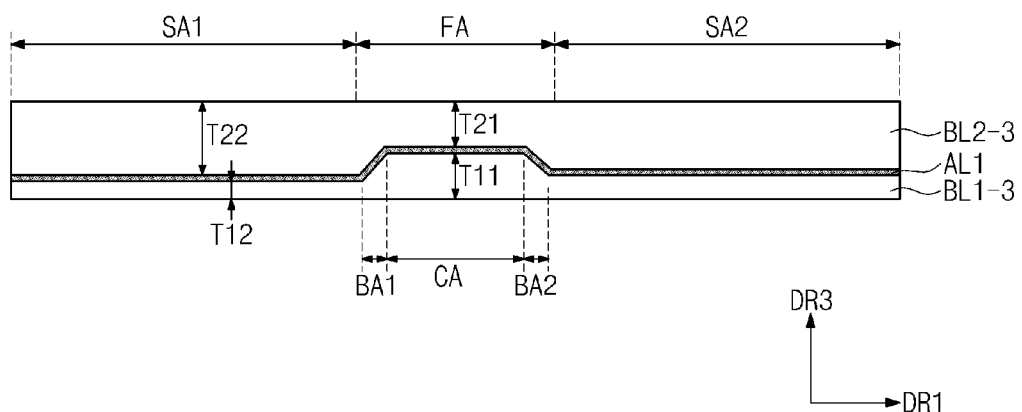

FIGS. 4A to 4C are side views showing exemplary embodiments of window members according to the invention. In FIGS. 4A to 4C, the same reference numerals denote the same elements in FIGS. 1A to 3, and thus detailed descriptions of the same elements will be omitted.

Referring to FIG. 4A, a width W10 in the first direction DR1 of the first portions of first and second base layers BL1-1 and BL2-1 is smaller than a width in the first direction DR1 of the folding area FA. The first portions of the first and second base layers BL1-1 and BL2-1 are respectively considered defined by portions thereof having a different thickness than the adjacent second portions thereof, and overlapping the folding area FA.

The bending stiffness of the folding area FA is reduced by the stacking structure of the first and second base layers BL1-1 and BL2-1. Although the second portions of the first and second base layers BL1-1 and BL2-1 are partially overlapped with the folding area FA, the bending stiffness of the folding area FA is reduced by the stacking structure of the first and second base layers BL1-1 and BL2-1 in the folding area FA.

Referring to FIGS. 4B and 4C, the thickness of the first portions of first and second base layers, which is overlapped with the folding area FA, is not uniform.

As shown in FIG. 4B, the first portion of the first base layer BL1-2 has a peak in a cross-section taken along the first direction DR1. The first portion of the first base layer BL1-2 has a boundary surface that makes contact with the adhesive layer AL1.

The boundary surface has a boundary line in a cross-section of the first portion of the first base layer BL1-2, which is taken along the first direction DR1. According to another exemplary embodiment, the boundary surface may have different boundary line with the peak in the cross-section of the first portion of the first base layer BL1-2, which is taken along the first direction DR1.

The thickness T11 of the first portion of the first base layer BL1-2 corresponds to a range of about 80% to about 120% of the thickness T21 of the first portion of the second base layer BL2-2. In the illustrated exemplary embodiment, the thickness T11 of the first portion of the first base layer BL1-2 is defined by a maximum value measured at the peak position and the thickness T21 of the first portion of the second base layer BL2-2 is defined by a minimum value measured at the peak position.

According to the illustrated exemplary embodiment, even though the light is provided to the window member, the boundary between the first portion of the first base layer BL1-2 and the second portion of the first base layer BL1-2 is not optically recognized. The boundary between the first portion of the first base layer BL1-2 and the second portion of the first base layer BL1-2 is not optically recognized because the thickness T11 of the first portion of the first base layer BL1-2 is gradually varied along the first direction DR1.

As shown in FIG. 4C, the first portion of the first base layer BL1-3 includes a center portion CA, and boundary portions BA1 and BA2, each having a thickness different from that of the center portion CA, in the first direction DR1.

The thickness T11 of the first portion of the first base layer BL1-3 corresponds to a range of about 80% to about 120% of the thickness T21 of the first portion of the second base layer BL2-3. In the illustrated exemplary embodiment, the thickness T11 of the first portion of the first base layer BL1-3 is measured at the center portion CA, and the thickness T21 of the first portion of the second base layer BL2-3 is measured at a portion of the second base layer BL2-3, which corresponds to the center portion CA. Again, the boundary between the first portion of the first base layer BL1-3 and the second portion of the first base layer BL1-3 may not optically recognized because the thickness T11 of the first portion of the first base layer BL1-3 is gradually varied along the first direction DR1.

The gradual variation of the thicknesses of the first base layer BL1 may be configured by a curved cross-sectional profile (refer to FIG. 4B) or a trapezoidal cross-sectional profile (refer to FIG. 4C), for example, but the invention is not limited thereto. While the width in the first direction DR1 of the first portions of the base layers in FIG. 4B and FIG. 4C is shown substantially same as the width in the first direction DR1 of the folding area FA, the invention is not limited thereto. In an exemplary embodiment, the width in the first direction DR1 of the first portions of the base layers having the gradually varied thickness may be less than the width of the folding area FA, referring to FIG. 4A.

Figure 5:
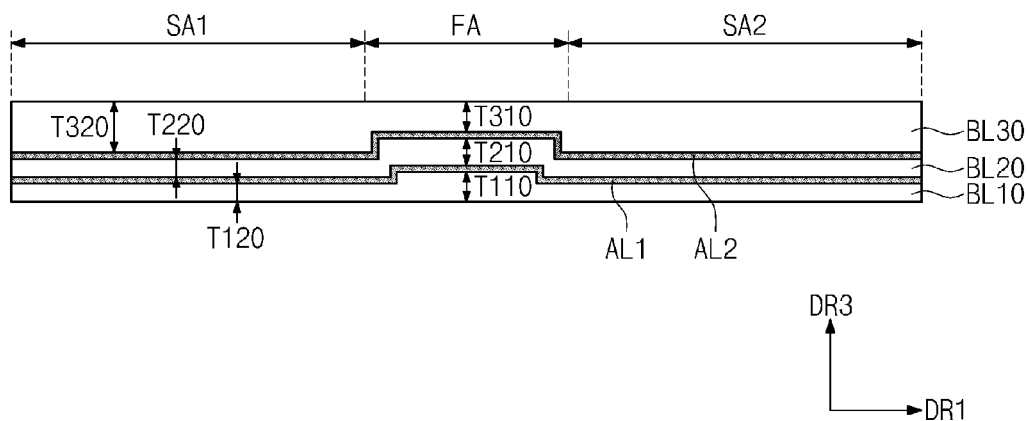
FIG. 5 is a side view showing still another exemplary embodiment of a window member according to the invention.

FIG. 5 is a side view showing still another exemplary embodiment of a window member according to the invention. In FIG. 5, the same reference numerals denote the same elements in FIGS. 1A to 3, and thus detailed descriptions of the same elements will be omitted. In addition, the structures of the window member shown in FIGS. 4A to 4C may be applied to the window member shown in FIG. 5.

Referring to FIG. 5, the window member includes a plurality of base layers BL10, BL20 and BL30. Adhesive layers AL1 and AL2 are respectively disposed between adjacent base layers among the plurality of base layers BL10, BL20 and BL30.

The window member has a triple-layer structure of first, second and third base layers BL10, BL20 and BL30. The stacking structure of the window member should not be limited thereto or thereby. In relative position, the third base layer BL30 corresponds to the second base layer BL2 described with reference to FIGS. 2A and 2B. The third base layer BL30 is farthest away from the display panel DP (refer to FIGS. 1A and 1B) and serves as the outer surface of the display device.

The third base layer BL30 includes a first portion overlapped with the folding area FA and second portions overlapped with the peripheral areas SA1 and SA2. A thickness T310 of the first portion of the third base layer BL30 is smaller than a thickness T320 of the second portions of the third base layer BL30.

The first, second and third base layers BL10, BL20 and BL30 have the same elastic modulus. In addition, the first, second and third base layers BL10, BL20 and BL30 include the same material.

The thickness T110 of the first portion of the first base layer BL10 and the thickness T210 of the first portion of the second base layer BL20 correspond to a range of about 80% to about 120% of the thickness T310 of the first portion of the third base layer BL30. In other words, the thickness T110 of the first portion of the first base layer BL10, the thickness T210 of the first portion of the second base layer BL20 and the thickness T310 of the first portion of the third base layer BL30 may be the same. This is to maintain the low bending stiffness of the window member in the folding area FA. Again, the first portions of the first, second and third base layers BL10, BL20 and BL30 may respectively be considered defined by portions thereof having a different thickness than the adjacent second portions thereof, and overlapping the folding area FA.

A thickness T320 of the second portions of the third base layer BL30 is greater than a thickness T120 of the second portions of the first base layer BL10 and a thickness T220 of the second portions of the second base layer BL20. To maintain the predetermined stiffness in the peripheral areas SA1 and SA2, the thickness T120 of the second portions of the first base layer BL10 and the thickness T220 of the second portions of the second base layer BL20 are equal to or smaller than about 40% of the thickness T320 of the second portions of the third base layer BL30.

In addition, in order to increase the stiffness of the peripheral areas SA1 and SA2, a sum of the thickness T120 of the second portions of the first base layer BL10 and the thickness T220 of the second portions of the second base layer BL20 is equal to or smaller than about 40% of the thickness T320 of the second portions of the third base layer BL30.

As shown in FIG. 5, the thicknesses T110 and T210 of the first portions of the first and second base layers BL10 and BL20, which are overlapped with the folding area FA, are greater than the thicknesses T120 and T220 of the second portions of the first and second base layers BL10 and BL20, which are overlapped with the peripheral areas SA1 and SA2. The structure of the first and second base layers BL10 and BL20 should not be limited thereto or thereby. In an exemplary embodiment, for instance, any one of the first and second base layers BL10 and BL20 may have a uniform thickness regardless of the area of the window member.

Figure 6:
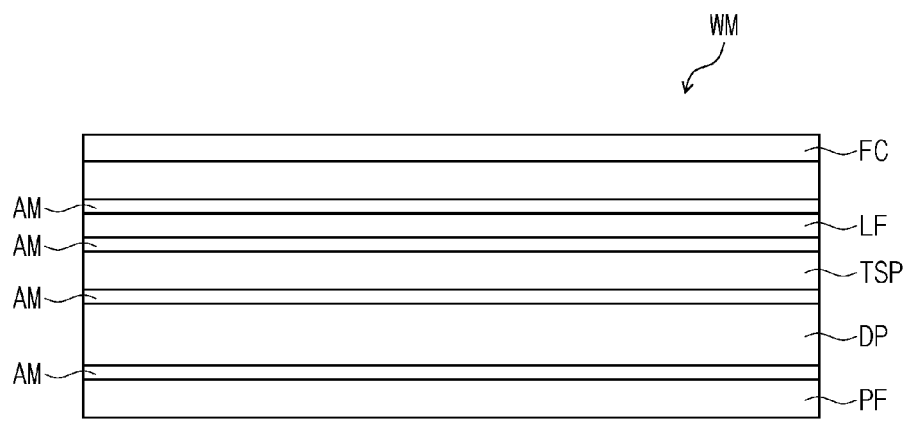
FIG. 6 is a cross-sectional view showing another exemplary embodiment of a flexible display device according to the invention.

FIG. 6 is a cross-sectional view showing another exemplary embodiment of a flexible display device according to the invention.

The flexible display device (hereinafter, referred to as a display device) includes a flexible display panel DP (hereinafter, referred to as a display panel), a flexible window member WM (hereinafter, referred to as a window member), and functional members. The window member may be any one of the window members described with reference to FIGS. 1A and 5.

The functional members include a touch screen TSP and an optical member LF, which are disposed between the display panel DP and the window member WM. The touch screen TSP that is configured to sense external inputs is coupled to the display panel DP by an adhesive member AM.

The optical member LF is coupled to the touch screen TSP by the adhesive member AM. The optical member LF may include at least a polarizing plate, and may further include a retardation plate. The optical member LF is configured to prevent an external light from being reflected to a viewing side of the display device. In an exemplary embodiment, the optical member LF may be omitted from the display device or included within the touch screen TSP.

A functional coating layer FC may be disposed on the outer surface of the window member WM. The functional coating layer FC may include at least one of an anti-fingerprint coating layer, an anti-reflection coating layer, an anti-glare coating layer and a hard coating layer.

The functional members may further include a protective film PF disposed on the outer surface of the display panel DP. The protective film PF protects the display panel DP from external impacts. The protective film PF is coupled to the display panel DP by the adhesive member AM.

Although exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A flexible display device comprising:
a flexible display panel comprising a folding area in which a folding axis is defined, and a peripheral area adjacent to the folding area; and
a window member on a surface of the flexible display panel and overlapping the folding area and the peripheral area, the window member comprising:
a first base layer on the flexible display panel; and
a second base layer on the first base layer and having a same elastic modulus as the first base layer,
wherein a first thickness portion of the second base layer, which overlaps the folding area, has a thickness smaller than a thickness of a second thickness portion of the second base layer, which is different from the first thickness portion and overlaps the peripheral area.

2. The flexible display device of claim 1, wherein the window member has a substantially uniform thickness.

3. The flexible display device of claim 2, wherein the thickness of the window member is in a range from about 20 micrometers to about 300 micrometers.

4. The flexible display device of claim 2, wherein the window member comprises a flat outer surface defined by a surface of the second base layer.

5. The flexible display device of claim 2, wherein a first thickness portion of the first base layer, which corresponds to the first thickness portion of the second base layer, has a thickness greater than a thickness of a second thickness portion of the first base layer, which is different from the first thickness portion thereof and corresponds to the second thickness portion of the second base layer.

6. The flexible display device of claim 1, wherein the first and second base layers comprise a substantially same material.

7. The flexible display device of claim 6, wherein a first thickness portion of the first base layer, which overlaps the first thickness portion of the second base layer, has a thickness corresponding to about 80% to about 120% of the thickness of the first thickness portion of the second base layer.

8. The flexible display device of claim 7, wherein a second thickness portion of the first base layer, which overlaps the second thickness portion of the second base layer, has a thickness equal to or smaller than about 40% of the thickness of the second thickness portion of the second base layer.

9. The flexible display device of claim 1, wherein a width in a first direction substantially perpendicular to the folding axis and a thickness direction, of the first thickness portion of the second base layer, is equal to or smaller than a width in the first direction of the folding area.

10. The flexible display device of claim 9, wherein the first thickness portion of the second base layer has a uniform thickness.

11. The flexible display device of claim 9, wherein the first thickness portion of the second base layer has a peak position in a cross-section, taken along the first direction.

12. The flexible display device of claim 9, wherein
the first thickness portion of the second base layer comprises:
a center portion, and
boundary portions arranged adjacent to the center portion in the first direction,
wherein a thickness of the center portion is greater than the thicknesses of the boundary portions.

13. The flexible display device of claim 1, wherein the window member further comprises an optically transparent adhesive resin layer between the first base layer and the second base layer and attaching the first and second base layers to each other.

14. The flexible display device of claim 13, wherein the optically transparent adhesive resin layer has an elastic modulus equal to or smaller than about 1 megapascal.

15. The flexible display device of claim 1, further comprising a touch screen and a polarizing plate between the surface of the flexible display panel and the window member.

16. A flexible display device comprising:
a flexible display panel comprising a folding area, and a peripheral area adjacent to the folding area; and
a window member on a surface of the flexible display panel and overlapping the folding area and the peripheral area, comprising a plurality of base layers having a substantially same elastic modulus,
wherein a first thickness portion of an outer base layer farthest away from the flexible display panel among the plurality of base layers, which overlaps the folding area, has a thickness smaller than a thickness of a second thickness portion of the outer base layer, which overlaps the peripheral area.

17. The flexible display device of claim 16, wherein the plurality of base layers comprises a substantially same material.

18. The flexible display device of claim 17, wherein a first thickness portion of each base layer except for the outer base layer among the plurality of base layers, which overlaps the first thickness portion of the outer base layer, has a thickness corresponding to about 80% to about 120% of the thickness of the first thickness portion of the outer base layer.

19. The flexible display device of claim 18, wherein a sum of thicknesses of second thickness portions of base layers except for the outer base layer among the plurality of base layers, which overlap the peripheral area, is equal to or smaller than about 40% of the thickness of the second thickness portion of the outer base layer.

20. The flexible display device of claim 19, wherein the window member has a substantially uniform thickness and comprises a flat outer surface defined by a surface of the outer base layer.

* * * * *